(12) United States Patent
Dallos, Jr. et al.

(10) Patent No.: US 8,713,746 B2
(45) Date of Patent: May 6, 2014

(54) DETACHABLE REAR WIPER SYSTEM

(75) Inventors: Robert Dallos, Jr., Canton, MI (US); Mark K Denison, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 645 days.

(21) Appl. No.: 13/012,190

(22) Filed: Jan. 24, 2011

(65) Prior Publication Data
US 2012/0186034 A1 Jul. 26, 2012

(51) Int. Cl.
*B60S 1/18* (2006.01)
*B60S 1/24* (2006.01)

(52) U.S. Cl.
USPC .............. 15/250.31; 15/250.3; 15/250.16; 192/66.1; 192/69.62

(58) Field of Classification Search
USPC .......... 15/250.3, 250.31, 250.16, 250.17, 15/250.19; 296/96.2, 96.15, 96.17; 192/66.1, 69.42, 69.62
See application file for complete search history.

(56) References Cited

U.S. PATENT DOCUMENTS

| | | | | |
|---|---|---|---|---|
| 2,046,108 A | * | 6/1936 | Drew | 15/250.3 |
| 3,059,264 A | * | 10/1962 | Ziegler | 15/250.17 |
| 3,264,671 A | * | 8/1966 | Carpenter | 15/250.3 |
| 5,924,324 A | * | 7/1999 | Kilker et al. | 74/89.18 |
| 6,493,900 B1 | * | 12/2002 | Koumo et al. | 15/250.3 |
| 6,792,643 B1 | * | 9/2004 | Ponziani | 15/250.31 |
| 6,952,857 B2 | | 10/2005 | Ponziani | |

FOREIGN PATENT DOCUMENTS

GB 1580926 * 12/1980

* cited by examiner

*Primary Examiner* — Gary Graham

(57) ABSTRACT

A vehicle wiper system includes a wiper arm, a motor including a motor shaft, and a drive connection through which torque is transmitted from the motor shaft to the wiper arm when the motor is energized, and at least partially releasing a connection between the motor shaft and the wiper arm when the motor is deenergized.

7 Claims, 2 Drawing Sheets

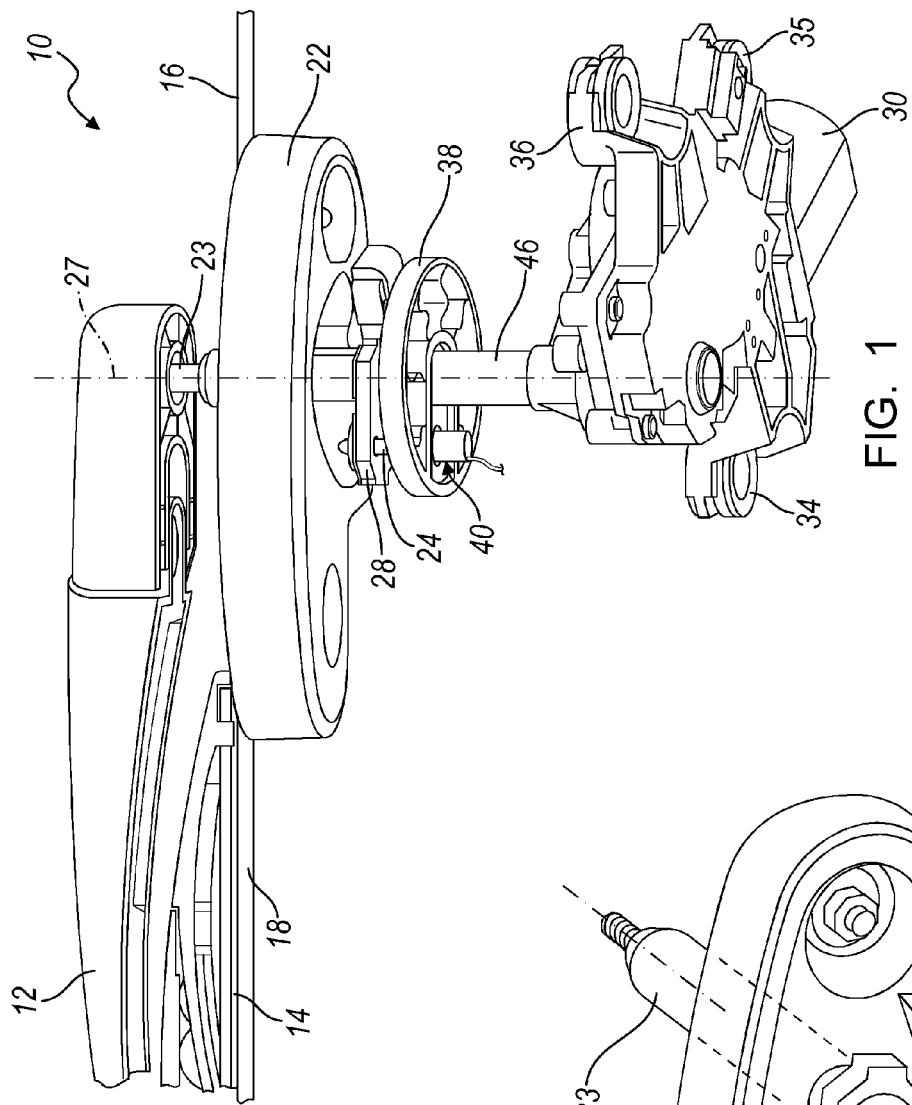
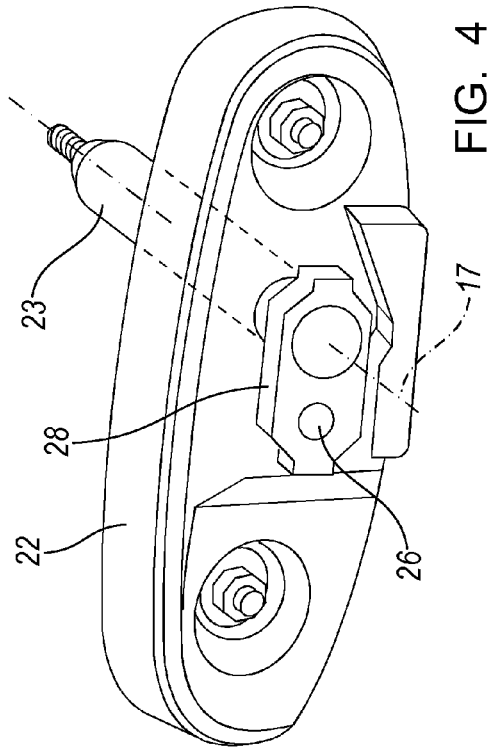

DETACHABLE REAR WIPER SYSTEM

BACKGROUND OF INVENTION

The present invention relates generally to a rear wiper arm assembly for the lift gate of a motor vehicle.

In the automobile industry today, a detachable rear wiper arm system may be used on sport utility vehicles (SUV) and other such vehicles that have a hatch glass able to open separately from a lift gate. When the vehicle moves through a car wash, it is possible for wiper arm to become tangled with the car wash equipment resulting in the wiper arm being bent or broken.

In current practice, plastic rear wiper arms used on SUVs have much higher warranty costs as compared to the use of steel wiper arms, limiting the desire to use plastic rear wiper arms.

A need exists in the industry for an improved vehicle rear wiper system whose hatch glass is able to open separately from the lift gate. The wiper system should prevent permanent damage to the rear wiper arm during car wash usage and provide the opportunity to use plastic material for rear wiper arms.

SUMMARY OF INVENTION

A vehicle wiper system includes a wiper arm, a motor including a motor shaft, and a drive connection through which torque is transmitted from the motor shaft to the wiper arm when the motor is energized, and at least partially releasing a connection between the motor shaft and the wiper arm when the motor is deenergized.

The assembly lowers the potential damage to vehicle wiper arms caused by car wash equipment. By minimizing the current spring loaded latch pin engagement feature and using a non-conductive plate and electromagnet or solenoid to more fully engage the coupling pin during wiper system usage, the potential for rear wiper arm damage is reduced.

The assembly prevents permanent damage to the wiper arm during car wash usage and improves the opportunity to use plastic rear wiper arms having a warranty cost equal to or lower than that of steel rear wiper arms.

Use of a plastic rear wiper arm reduces weight and parts costs and enhances styling and design of the wiper arm.

The scope of applicability of the preferred embodiment will become apparent from the following detailed description, claims and drawings. It should be understood that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

FIG. 1 is a top perspective view of a rear wiper system for a vehicle lift gate;

FIG. 4 is a perspective rear view showing the lever and wiper shaft.

DETAILED DESCRIPTION

Figure 3:
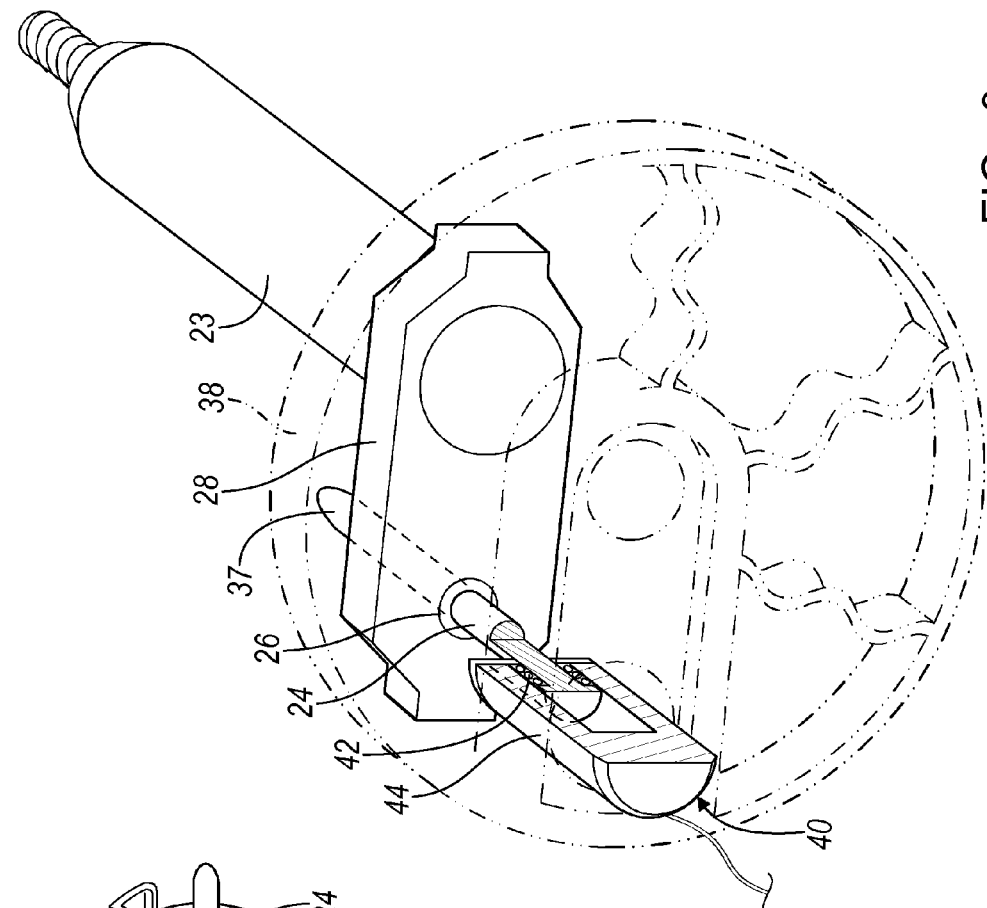
FIG. 3 is a perspective top view showing the drive pin, lever, gear wheel and actuator.
Figure 2:
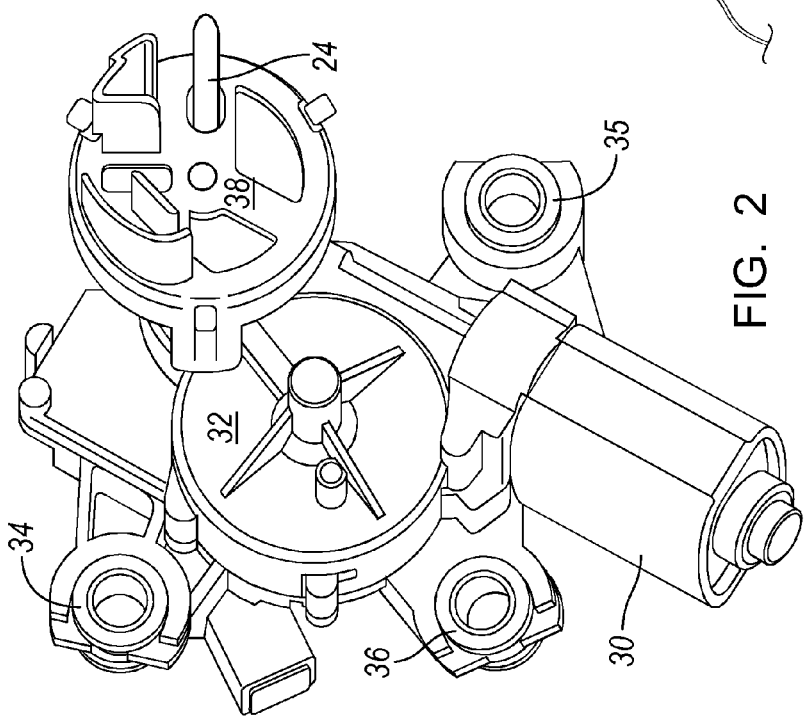
FIG. 2 is perspective front view of the motor assembly and gear wheel of FIG. 1.

FIGS. 1-4 illustrate a rear wiper system 10 having a wiper arm 12 and wiper blade 14, which oscillates across the exterior surface 16 of a rear glass pane 18 located on a lift gate of a vehicle. The hatch glass 18 swings upward to provide access to the cargo area and is able generally to open separately from the lift gate.

The system 10 further includes a plate 22, which is secured to the glass pane 18 so that the plate 22 and glass pane 18 move as a unit. The rear wiper arm 12 is attached by a shaft 23 to the glass 18 and plate 22. The wiper arm 12 oscillates about axis 27.

A drive pin 24 enters and exits a hole 26 formed eccentric of axis 27 in a drive lever 28, which is secured to shaft 23.

A rear wiper motor 30 is secured to the lift gate by a bracket 32, which is attached to the lift gate by mechanical attachments secured to bosses 34, 35, 36. As shown in FIG. 3, the surface 37 along a length of the drive pin 24 extending toward its tip is conical. The conical surface 37 facilitates passing the drive pin 24 through hole 26 when producing a drive connection between the motor 30 and the wiper arm 12. The conical surface 37 also allows the drive pin 24 to disengage readily from hole 26 when the wiper arm 12 is rotated externally after having partially retracted the drive pin 24 from hole 26. When the drive pin 24 disengages from hole 26, the wiper arm 12 is disengaged from the motor and drive assembly.

A gear wheel 38, driven by motor 30, supports an actuator 40 for drive pin 24. Actuator 40 contains a compression spring 42, which urges drive pin 24 to retract into the actuator 40 and to, at least partially, disengage from hole 26 in the drive lever 28. Actuator 40 includes an electromagnet or solenoid 44, which when energized forces drive pin 24 to enter hole 26 against the bias of the spring 42, thereby driveably engaging the drive lever 28.

The spring loaded drive pin 24 couples the wiper arm 12 to the drive motor shaft 46.

In operation, when motor 30 is off and solenoid 44 deactivated, the spring loaded drive pin 24 retracts within actuator 40 to a less engaged position in hole 26, thereby allowing the drive pin 24 to slip out of the drive plate hole 26, to disengage the drive lever 28, and to allow the rear wiper arm 12 to move if arm 12 encounters rotational force other than that produced by the motor 30. A force applied to the wiper arm 12 by car wash equipment would cause the wiper arm to move free from the motor 30, gear wheel 38, and drive pin 24.

When solenoid 44 is energized, the drive pin 24 extends deeper into the hole 26 of the drive lever 28, thereby engaging the wiper arm 12 without slipping as the motor shaft 46 oscillates.

Preferably either the drive lever 28 or drive pin 24 is coated with a low friction material to facilitate the spring loaded drive pin 24, which may be out of position due to abuse or movement of the wiper arm 12 during glass operation, to move on the drive lever face until it engages the hole 26 in the drive lever 28.

While certain embodiments of the present invention have been described in detail, those familiar with the art to which this invention relates will recognize various alternative designs and embodiments for practicing the invention as defined by the following claims.

What is claimed is:

1. A vehicle wiper system, comprising:
    a wiper arm including a wiper blade contacting an outer surface of a glass pane located on a vehicle lift gate;
    a motor including a motor shaft, secured to an inner surface of the lift gate;
    a detachable drive connection transmitting torque from the motor shaft to the wiper arm when the motor is energized, and at least partially releasing a connection between the motor shaft and the wiper arm when the motor is deenergized;

a wheel connected to the motor shaft;

a drive pin supported on the wheel;

a spring urging the drive pin to disconnect the motor shaft from the wiper arm; and a solenoid for connecting the drive pin and the wiper arm.

2. A vehicle wiper system, comprising:

a wiper arm including a wiper blade contacting an outer surface of a glass pane located on a vehicle lift gate;

a motor including a motor shaft, secured to an inner surface of the lift gate;

a detachable drive connection transmitting torque from the motor shaft to the wiper arm when the motor is energized, and at least partially releasing a connection between the motor shaft and the wiper arm when the motor is deenergized;

a wheel secured to the motor shaft;

a drive pin supported on the wheel;

a lever secured to the wiper arm and formed with an opening;

a solenoid for engaging the drive pin in the opening; and a spring urging the drive pin to disengage from the opening.

3. The system of claim 2 wherein a length of the drive pin is formed with a conical surface.

4. The system of claim 2, wherein one of the lever and the drive pin is coated with a low friction material to facilitate engaging the drive pin with the opening.

5. A vehicle wiper system, comprising:

a wiper arm including a wiper blade contacting an outer surface of a glass pane located on a vehicle lift gate;

a motor including a motor shaft, secured to an inner surface of the lift gate;

a detachable drive connection transmitting torque from the motor shaft to the wiper arm when the motor is energized, and at least partially releasing a connection between the motor shaft and the wiper arm when the motor is deenergized;

a wheel secured to the motor shaft;

a drive pin supported on the wheel;

a lever secured to the wiper arm by a shaft aligned with the motor shaft and formed with an opening;

a solenoid for engaging the drive pin in the opening; and a spring urging the drive pin to disengage from the opening.

6. The system of claim 5, wherein one of the lever and the drive pin is coated with a low friction material to facilitate engaging the drive pin with the opening.

7. The system of claim 5 wherein a length of the drive pin is formed with a conical surface.

* * * * *